Oct. 21, 1930.   C. M. DIBBLE   1,779,271
COLLAPSIBLE JIB CRANE
Filed Aug. 7, 1926   2 Sheets-Sheet 1
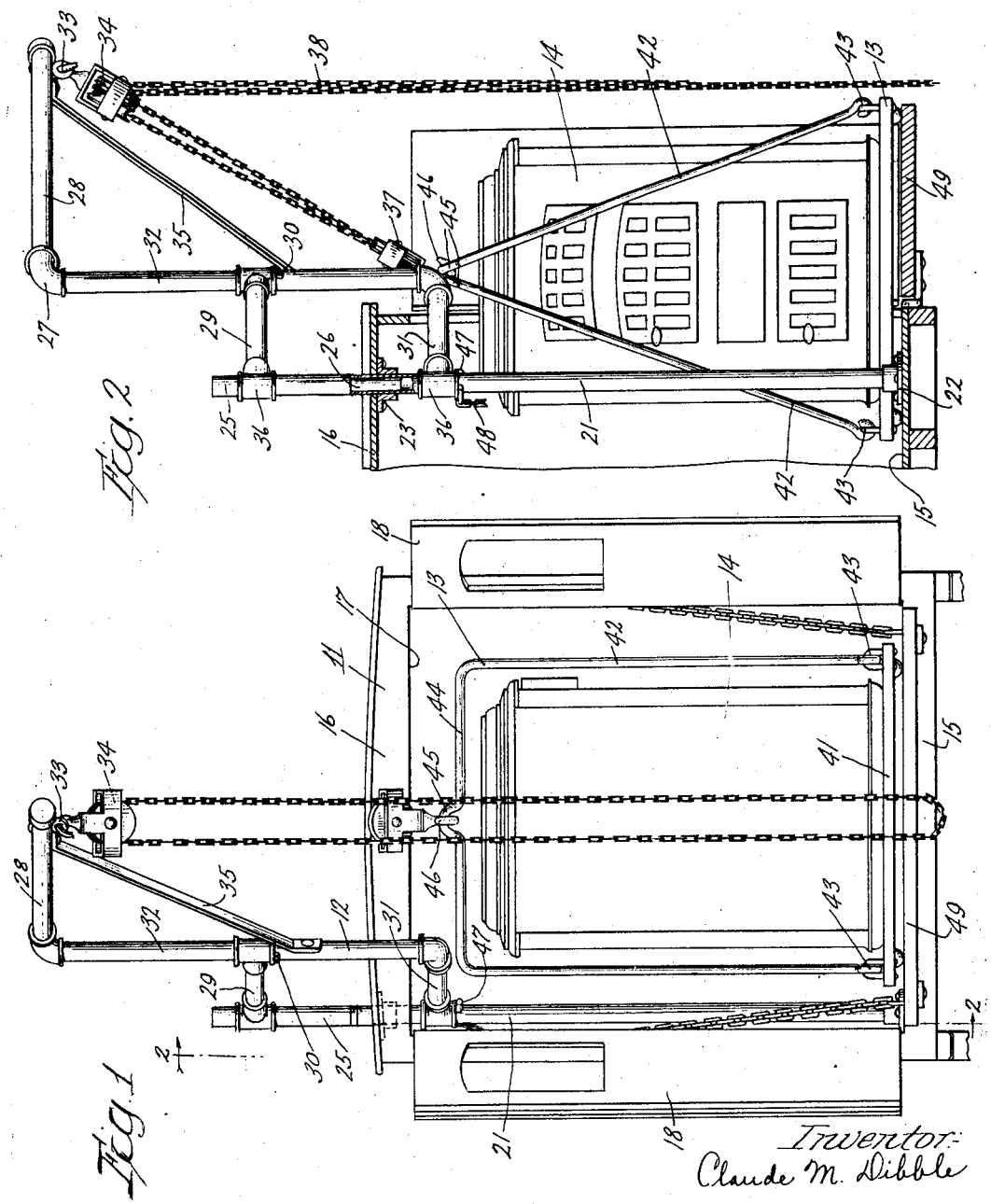

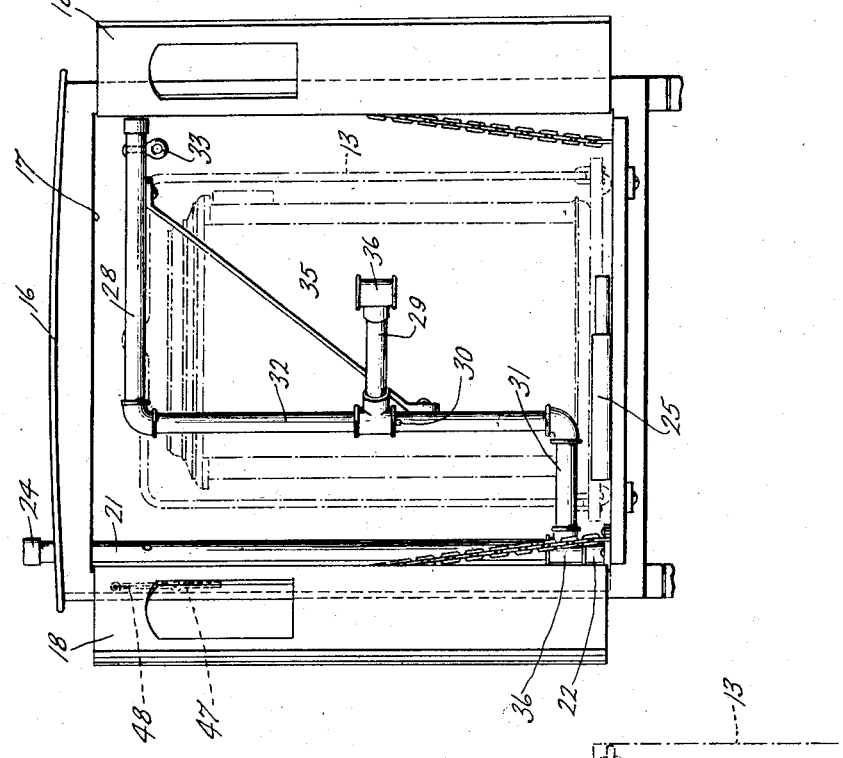
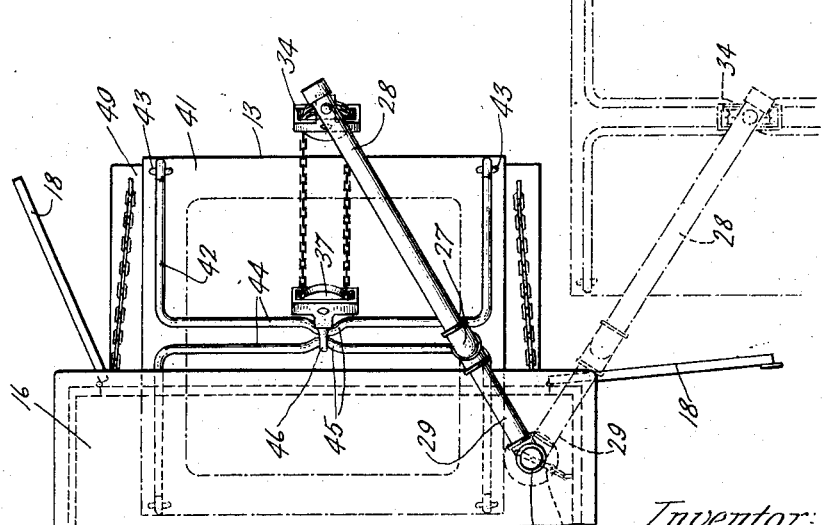

Patented Oct. 21, 1930

1,779,271

UNITED STATES PATENT OFFICE

CLAUDE M. DIBBLE, OF JOLIET, ILLINOIS, ASSIGNOR TO MOORE BROTHERS COMPANY, OF JOLIET, ILLINOIS, A CORPORATION OF ILLINOIS

COLLAPSIBLE JIB CRANE

Application filed August 7, 1926. Serial No. 127,794.

This invention relates in general to a hoisting device and more particularly to a hoisting device or crane for vehicles or the like, and has for an object the provision of a hoisting device which may be mounted in the body of a vehicle such as the closed compartment body of an automobile or the like which will extend thereabove when in operative position to permit of lifting articles of a height substantially equal to the opening of the vehicle body, such as the rear or loading opening thereof and which may be folded or collapsed to fit within the body of the vehicle when not in use.

Another important object of the invention is to provide a device which is light in structure and which may be easily manipulated by one person.

Another important object is to provide a carrier for co-operating with the crane or lifting device to lift articles such as stoves and the like into the vehicle body, a device which is light and durable, that may be engaged by a hook of the tackle devices, and which will not tip during a lifting or lowering operation.

Another important object is to provide a device that may be cheaply and economically manufactured.

Numerous other objects and advantages of the invention will be apparent as it is better understood from the following description, which, taken in connection with the accompanying drawings, discloses a preferred embodiment thereof.

Referring to the drawings:

Fig. 1 is a rear elevational view of a vehicle body having a device attached thereto embodying my invention;

Fig. 2 is a section taken substantially on line 2—2 Fig. 1;

Fig. 3 is a plan view of the device shown in Fig. 1; and

Fig. 4 is a view similar to that shown in Fig. 1 with the crane arm folded within the vehicle body.

To illustrate my invention I have shown a vehicle body 11, a hoisting device or crane 12, a carrier 13, and to illustrate one use of the device, a stove 14.

The vehicle body 11 is of the closed delivery van type comprising a closable compartment having a floor 15 suitable side walls and a top 16. An end of the body is provided with an opening 17 through which the vehicle may be loaded or unloaded and suitable doors 18 are or may be provided for closing the opening during movement of the vehicle. The hoisting device 12 includes a post 21 which may be of any suitable size and form and is preferably formed from standard size pipe or the like. This post is suitably secured to the floor 15 by means of a pipe flange 22 or similar device bolted to the floor and to the top 16 by a flange device 23. The post 21 extends from the floor 15 through the body and the top 16 at least a sufficient distance to receive a cap 24 which is preferably provided to close the top end of the post when the crane is not in use to keep rainwater and other undesirable material out of the interior of the post. The post is preferably provided with a telescopic extension portion 25 that is preferably of the same external diameter as the post 21 and formed to provide a portion 26 of reduced diameter that will fit snugly within the post 21. A crane arm 27 is mounted on the post that is preferably a built-up unit, that is, it is formed of horizontally disposed arms 28, 29 and 31 suitably connected by means of a vertically disposed connecting member 32. The arm 28 may extend any suitable distance and is provided with a ring member 33 in which the hook of a block 34 of the hoisting devices may be engaged. The arms 29 and 31 extend from the member 32 in a direction opposite to the arm 28 and are of substantially equal length. The arm 29 is preferably rotatably mounted on the member 32 and rides on a pin 30, the arm 31 is suitably and rigidly secured to the member 32. A brace 35 may be provided for supporting the end of arm 28 from the member 32, or for re-inforcing the arm 28. The arms 29 and 31 are provided with bearing portions 36 at their ends that are formed to engage over the post 21 and its telescopic extension 25 and to slide therealong, and in the present instance I have shown pipe T's providing these bearings.

The hoisting device or devices also include a block 37 and flexible member or chain 38. The carrier 13 may be any suitable device that will support an article of the maximum height to be lifted or that will just fit within the vehicle body or pass through the opening 17 and in the present instance I have shown a platform 41 upon which the article to be lifted may be positioned substantially, as illustrated, and a pair of handles 42 suitably attached to the platform or attached thereto at a plurality of spaced points 43. The handles 42 are preferably substantially of U-shape and arranged so that the top portions 44 thereof are formed to provide short loops 45, which may be engaged by a tackle hook 46 of the hoisting devices substantially as shown. I have shown the crane in operative position in Figs. 1, 2 and 3, the crane being held in this position by a pin 47 or like device extending through the post 21 and that may be permanently secured to the vehicle body in any suitable manner such as by means of a chain 48 or other flexible connector to prevent loss or misplacement thereof. It will be noted that when the crane is in this operative position an article such as the stove 14 may be lifted from the ground or from an endgate 49 of the vehicle and swung about the post 21 as illustrated by the dotted line position shown (Fig. 3) so that a stove may be lifted from a position at the rear of the vehicle or out at one side swung about the post 21 and then lowered on to the endgate for loading in the vehicle and vice versa. When the vehicle is loaded or during movement of the vehicle such as during the transportation of articles the crane is folded within the body 11 substantially as shown (Fig. 4), the telescopic extension 25 of the post 21 being removed from the post and placed within the body, the arm 29 being swung about the member 32 and out of the way of the top 16 and the crane arm 27 lowered to the position shown, the bearing 36 of the arm 31 sliding along the post 21. The carrier 13 may be shoved right into the body 11 with an article still positioned thereon and in the vehicle in any convenient location. When it is desired to again use the crane the crane arm is returned to the position shown in Figs. 1 and 2 which may be accomplished by one operator and is ready for immediate use.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A hoisting crane for covered housings and the like, comprising, a supporting post attached to the housing, hoisting devices, and means for supporting the hoisting devices from the supporting post, said means being rotatably mounted on the post at a plurality of points of suspension, and detachable at one said point of suspension.

2. A hoisting crane for covered housings and the like, comprising, a supporting post attached to the body of a housing, hoisting devices, and means for supporting the hoisting devices from the supporting post, said means being rotatably mounted on the post by means of collars embracing the posts at a plurality of points, and said collars being axially movable on the post and another said collar being detachably mounted on said post.

3. A hoisting crane for covered housings and the like, comprising, a post supported by the housing, hoisting devices, and means for supporting the hoisting devices from said posts, said means comprising a plurality of horizontally disposed arms and a vertically disposed member connecting said arms, at least one of said arms being rotatably connected with said vertically disposed member.

4. A hoisting crane for covered housings and the like, comprising, a post supported by the housings, hoisting devices, and means for supporting the hoisting devices from said posts, said means comprising a plurality of horizontally disposed arms mounted on said post, and a hoisting device carrying member carried by said arms, said arms being adapted to allow relative axial and rotational movement of said vertically disposed member about the post.

5. A hoisting crane for covered housings and the like, comprising, a post supported by the housing, hoisting devices, means, comprising a plurality of horizontally disposed arms rotatably engaging said post and a member connecting said arms assembled as a unit structure adapted to move axially along and rotatably about the post, and means for locking the unit structure against axial movement on the post, one said arm being detachable from said post and rotatably mounted upon said arm connecting member.

6. In combination, a hoisting crane for covered vehicles and the like, comprising, a collapsible hoisting device attached to the vehicle and arrangeable over the vehicle when in operative position, and a carrier, said carrier comprising, a platform for supporting articles to be hoisted, and rigid handles connected thereto and formed for engagement by a tackle hook of the hoisting device.

7. In combination, a hoisting crane for covered vehicles and the like, comprising, a collapsible hoisting device attached to the vehicle and arrangeable over the vehicle when in operative position, and a carrier, said carrier comprising, a platform for supporting articles to be hoisted, and rigid handles connected thereto and formed for engagement by a tackle hook of the hoisting device at a distance from the platform greater than the height of an article to be lifted to prevent tipping of the platform.

8. In combination, a hoisting crane for covered vehicles and the like, comprising, a collapsible hoisting device attached to the vehicle and arrangeable over the vehicle when in operative position, and a carrier, said carrier comprising, a platform, and a pair of substantially U-shaped carrier handles attached to the platform at spaced points and arranged so that portions thereof will come together to engage a hook of the hoisting devices.

9. A hoisting device for closed vehicles, comprising, a post mounted on the floor of the vehicle and having a portion extending through the top wall thereof, a crane support having arms engaging the post above and below the top wall of the vehicle body, and means for disconnecting the upper crane arm from the post to allow the crane arm to be arranged within the vehicle body when not in use, the lower arm being slidable axially along the post.

10. A hoisting device for covered housings and the like, comprising, a supporting post arranged within the housing and extending thereabove, a removable telescopic portion detachably engaging said post above the housing, a crane support having a lower arm rotatably mounted on the post within the housing and axially movable therealong and having a swinging arm connected thereto and engaging the telescopic portion of the post, and means for locking the crane arm against axial movement along the post.

11. A hoisting crane for covered housings and the like, comprising a vertical post supported within the housing, hoisting devices, and a plurality of horizontally disposed arms engaging said vertical post and a vertical hoist shaft connecting said arms, one of said arms being rotatably connected with said hoist shaft.

12. A hoisting device for covered housings, comprising a post mounted between the floor and the top wall of the housing and extending through said top wall, a crane support for arm portions engaging said post above and below the top wall of said housing, and means for disconnecting the upper crane arm from the post to allow the main support to be arranged within said housing when not in use, the lower arm of said crane support being slidable axially along the post.

13. A hoisting device for covered housings, comprising a support post arranged within the housing, a detachable post portion arranged to extend above said housing, a crane support having a lower arm rotatably engaging the post within the body housing and axially movable therealong and having a swinging arm connected thereto, said swinging arm engaging said detachable post portion above the housing, and means for locking the lower crane arm against axial movement along the post.

CLAUDE M. DIBBLE.